United States Patent
Takasu (10) Patent No.: US 11,107,379 B2
(45) Date of Patent: Aug. 31, 2021

(54) INFORMATION PROCESSING APPARATUS AND INFORMATION PROCESSING METHOD

(71) Applicant: Kabushiki Kaisha Toshiba, Tokyo (JP)

(72) Inventor: Nobuaki Takasu, Akishima (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/456,507

(22) Filed: Aug. 11, 2014

(65) Prior Publication Data

US 2015/0042698 A1 Feb. 12, 2015

Related U.S. Application Data

(60) Provisional application No. 61/864,914, filed on Aug. 12, 2013.

(51) Int. Cl.
G09G 3/20 (2006.01)
G01J 1/42 (2006.01)

(52) U.S. Cl.
CPC .............. *G09G 3/20* (2013.01); *G01J 1/4204* (2013.01); *G09G 2320/0626* (2013.01); *G09G 2360/144* (2013.01)

(58) Field of Classification Search
CPC .............. G09G 3/20; G09G 3/3406; G09G 2320/0626; G09G 2360/144; G01J 1/10
USPC ........ 345/102, 207, 619, 690–692; 348/645; 359/630; 455/466, 405
See application file for complete search history.

(56) References Cited

U.S. PATENT DOCUMENTS

| 4,829,308 A * | 5/1989 | Tol ........................ G01S 7/298 342/176 |
| 7,375,803 B1 * | 5/2008 | Bamji .................. G01S 7/4816 356/4.01 |
| 8,063,874 B2 | 11/2011 | Katayanagi et al. |
| 8,797,350 B2 * | 8/2014 | Fram .................... G06F 3/0338 345/619 |
| 2004/0012556 A1 * | 1/2004 | Yong .................... G06F 3/0202 345/102 |
| 2007/0242162 A1 * | 10/2007 | Gutta ..................... G06T 7/408 348/645 |
| 2009/0309711 A1 * | 12/2009 | Adappa ................. G06Q 30/02 340/501 |
| 2010/0060658 A1 | 3/2010 | Fujii et al. |
| 2011/0310073 A1 * | 12/2011 | Nagata ................. G06F 3/1423 345/207 |

(Continued)

FOREIGN PATENT DOCUMENTS

| JP | 2010-066405 | 3/2010 |
| JP | 2010-169909 | 8/2010 |

(Continued)

*Primary Examiner* — Prabodh M Dharia
(74) *Attorney, Agent, or Firm* — Rutan & Tucker, LLP (57) ABSTRACT

There is provided an information processing apparatus including a display portion, an illuminance sensor and a controller. The display portion has a display screen. The illuminance sensor measures an ambient brightness of the display screen at a first interval. The controller shifts the illuminance sensor to a state in which the illuminance sensor measures the ambient brightness at a second interval which is longer than the first interval when a change of the brightness is relatively small.

11 Claims, 5 Drawing Sheets

(56) References Cited

U.S. PATENT DOCUMENTS

| | | | |
|---|---|---|---|
| 2014/0021868 A1* | 1/2014 | Cho | G09G 3/3406 |
| | | | 315/158 |
| 2014/0063049 A1* | 3/2014 | Armstrong-Muntner | G03B 9/00 |
| | | | 345/619 |
| 2014/0092080 A1* | 4/2014 | Fukunaga | G09G 3/3696 |
| | | | 345/212 |
| 2014/0120961 A1* | 5/2014 | Buck | H04W 4/12 |
| | | | 455/466 |
| 2014/0128021 A1* | 5/2014 | Walker | H04W 52/0212 |
| | | | 455/405 |
| 2014/0132158 A1* | 5/2014 | Land | G09G 3/20 |
| | | | 315/152 |
| 2014/0184577 A1* | 7/2014 | Kim | G09G 5/10 |
| | | | 345/207 |
| 2014/0226214 A1* | 8/2014 | Edwards | G02B 23/10 |
| | | | 359/630 |

FOREIGN PATENT DOCUMENTS

| | | | | |
|---|---|---|---|---|
| JP | 2010-175997 | | 8/2010 | |
| JP | 2010-199706 | | 9/2010 | |
| TW | 201322245 A | * | 6/2013 | G09G 5/10 |

\* cited by examiner

INFORMATION PROCESSING APPARATUS AND INFORMATION PROCESSING METHOD

CROSS-REFERENCE TO RELATED APPLICATION(S)

This application claims priority from U.S. Provisional Patent Application No. 61/864,914 filed on Aug. 12, 2013, the entire contents of which are incorporated herein by reference.

TECHNICAL FIELD

An embodiment of the present invention relates to an information processing apparatus and an information processing method.

BACKGROUND ART

In information appliances such as PCs (Personal Computers), tablets or smartphones, a function for automatically adjusting luminance of the screen in accordance with ambient brightness is often provided due to high power consumption for screen display. For this reason, an illuminance sensor for measuring the ambient brightness is provided, and an operating system (OS) reads an illuminance value at a predetermined interval or upon detection of a change of the illuminance. Thus, electric power is consumed for the operation of the illuminance sensor and the operation of the system for reading the illuminance value.

However, when the illuminance is not lower than a predetermined value, the screen luminance of the appliance reaches an upper limit so that the screen luminance cannot be changed even when the illuminance changes. Due to the change of the illuminance, the illuminance sensor cannot enter a power saving mode, but the system still reads the illuminance value.

DESCRIPTION OF EMBODIMENT

An information processing apparatus and an information processing method according to an embodiment will be described below with reference to the accompanying drawings.

In the following embodiment, an information processing apparatus provided with a slate-type housing, such as a PDA (Personal Digital Assistants) or a cellular phone will be described by way of example.

Figure 1:
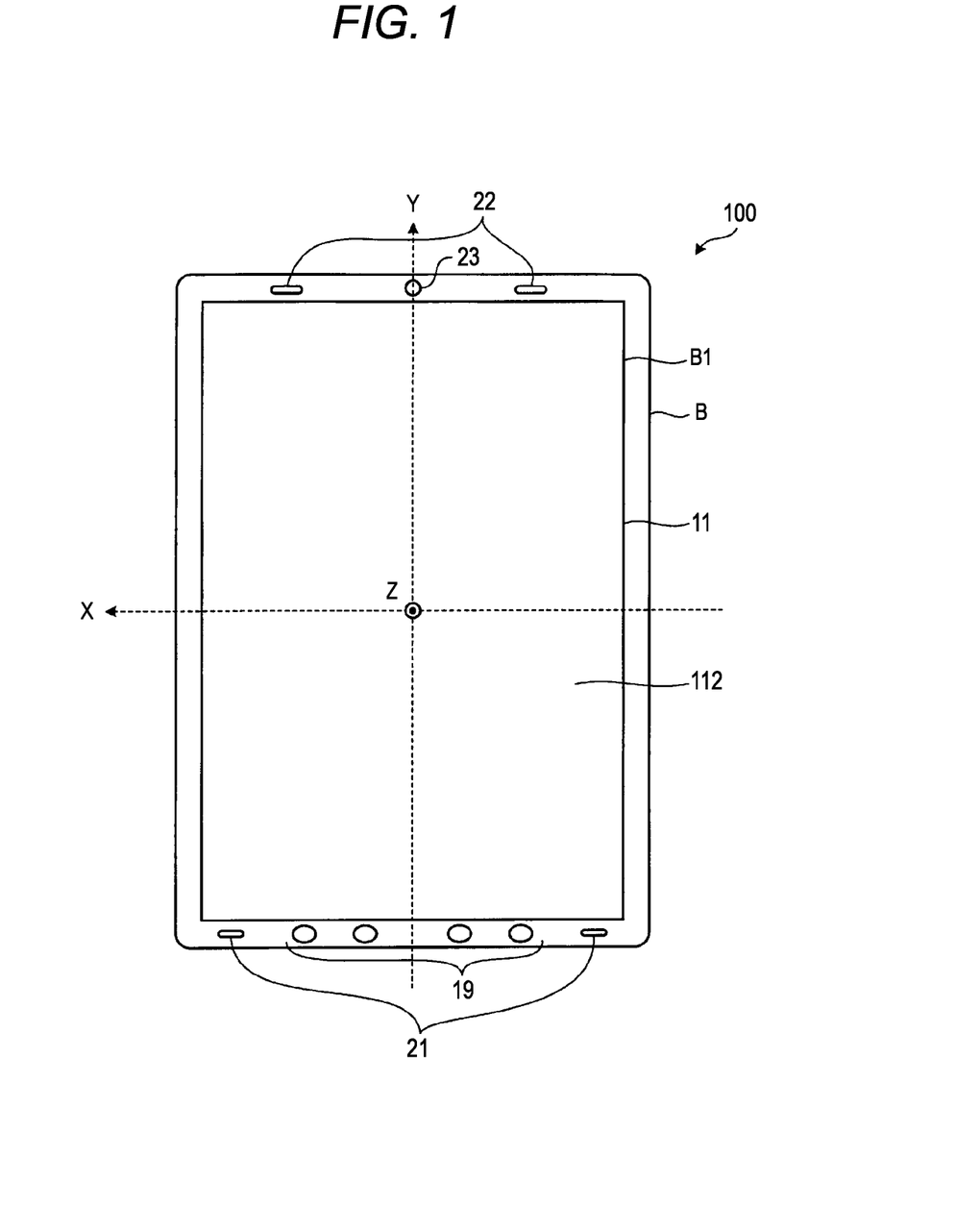
FIG. 1 is a view schematically showing the outline of an information processing apparatus according to an embodiment of the invention.

FIG. 1 is a view schematically showing the outline of an information processing apparatus according to the embodiment. An information processing apparatus 100 according to the embodiment is a slate-type information processing apparatus provided with a display portion 11 having a display screen 112. For example, the information processing apparatus 100 is implemented as a slate terminal (tablet terminal), an electronic book reader, a digital photo frame, etc. Directions of arrows of an X-axis, a Y-axis and a Z-axis (a direction in front of the drawing in the Z-axis) are set as positive directions herein.

The information processing apparatus 100 is provided with a thin box-like (slate-type) housing B. The housing B receives the display portion 11. In the embodiment, the housing B has a surface (hereinafter referred to as upper surface) having an opening portion B1 in which the display screen 112 belonging to the display portion 11 is exposed. The display portion 11 is provided with a touch panel 111 (see FIG. 2) for detecting a position on the display screen 112 touched by a user. Operating switches 19 on which the user can perform various operations and microphones 21 which are provided for acquiring voice of the user are disposed in a lower portion of the upper surface of the housing B. Speakers 22 provided for outputting the voice are disposed in an upper portion of the upper surface of the housing B. A connector (not shown) to which a headphone or an earphone for outputting the voice can be connected is disposed in an edge of the housing B. An illuminance sensor 23 for detecting ambient brightness is disposed in the upper portion of the upper surface of the housing B.

Figure 2:
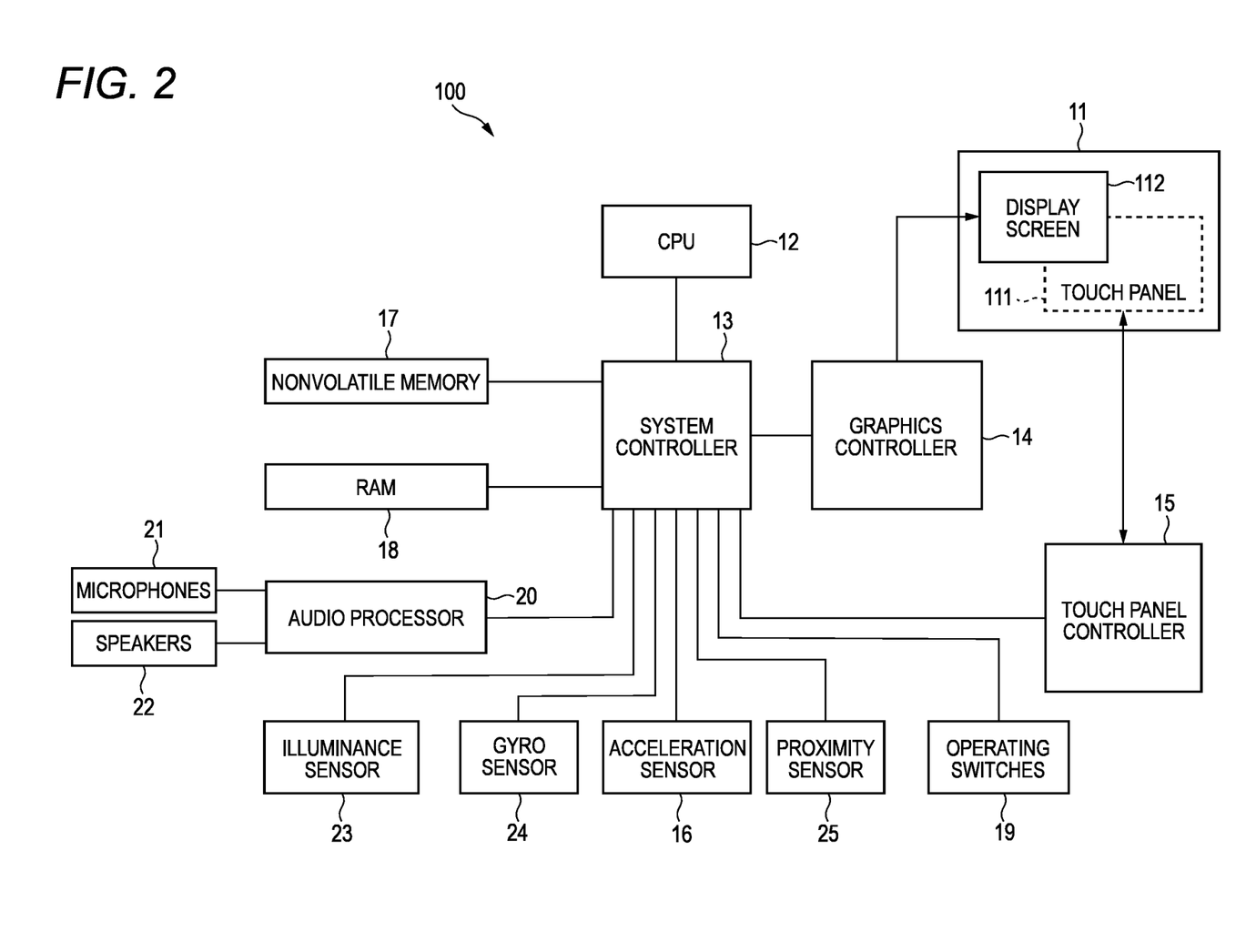
FIG. 2 is a block diagram showing an example of the hardware configuration of the information processing apparatus according to the embodiment.

FIG. 2 is a block diagram showing an example of the hardware configuration of the information processing apparatus according to the embodiment. As shown in FIG. 2, the information processing apparatus 100 according to the embodiment is provided with a CPU (Central Processing Unit) 12, a system controller 13, a graphics controller 14, a touch panel controller 15, an acceleration sensor 16, a nonvolatile memory 17, an RAM (Random Access Memory) 18, an audio processor 20, a gyro sensor 24, a proximity sensor 25, etc. in addition to the aforementioned configuration.

The display portion 11 is provided with the touch panel 111, and the display screen 112 such as an LCD (Liquid Crystal Display) or an organic EL (Electro Luminescence). For example, the touch panel 111 is a coordinate detecting device disposed on the display screen 112. The touch panel 111 detects a position (touch position) on the display screen 112 touched by a finger or fingers of the user holding the housing B.

The CPU 12 is a processor which controls respective portions of the information processing apparatus 100 through the system controller 13. The CPU 12 executes an operating system (OS) and various application programs such as a web browser and software used for creation of a document. The operating system and the application programs are loaded into the RAM 18 from the nonvolatile memory 17.

The nonvolatile memory 17 stores programs including the operating system, the various application programs, etc. and various kinds of data. The RAM 18 provides a working area for the CPU 12 to execute the programs.

The system controller (also functioning as an I/O controller) 13 has a built-in memory controller which controls access to the nonvolatile memory 17 and the RAM 18. In addition, the system controller 13 has a function of executing communication with the graphics controller 14.

The graphics controller 14 is a display controller controlling the display screen 112. The touch panel controller 15 controls the touch panel 111 and acquires, from the touch panel 111, coordinate data indicating a touch position on the display screen 112 touched by the user.

The illuminance sensor 23 is, for example, a photodiode, which detects the ambient brightness of the information processing apparatus 100. In the embodiment, as described above, the illuminance sensor 23 is disposed in the upper surface of the housing B and outputs, to the CPU 12, a brightness signal indicating the brightness in front of the display screen 112, that is, the ambient brightness of the information processing apparatus 100.

The gyro sensor 24 detects a rotation angle in the case where the information processing apparatus 100 is rotated around each of the X-axis, the Y-axis and the Z-axis. The gyro sensor 24 outputs, to the CPU 12, a rotation angle signal indicating a rotation angle around each of the X-axis, the Y-axis and the Z-axis.

The acceleration sensor 16 detects acceleration of the information processing apparatus 100. In the embodiment, the acceleration sensor 16 detects the acceleration in each of the X-axis, Y-axis and Z-axis directions shown in FIG. 1 and the acceleration in a rotation direction around each of the X-axis, the Y-axis and the Z-axis. The acceleration sensor 16 outputs, to the CPU 12, an acceleration signal indicating the acceleration in each of the X-axis, Y-axis and Z-axis directions shown in FIG. 1 and the acceleration in the rotation direction around each of the X-axis, the Y-axis and the Z-axis.

The proximity sensor 25 is a sensor which detects the proximity of an object to be detected in a non-contact manner. Specifically, a sensor such as a high frequency oscillation type sensor using electromagnetic induction, a magnetic type sensor using a magnet, or an electrostatic capacitance type sensor detecting a change of electrostatic capacitance between an object to be detected and the sensor may be used as the proximity sensor 25. Upon detection of the proximity of the object to be detected, the proximity sensor 25 outputs, to the CPU 12, a proximity signal indicating the proximity of the object to be detected.

The audio processor 20 applies voice processing such as analog-to-digital conversion, noise reduction and echo cancellation to a voice signal inputted from the microphones 21 and outputs the processed voice signal to the CPU 12. In addition, the audio processor 20 carries out voice processing such as voice synthesis under the control of the CPU 12 to generate a voice signal and outputs the generated voice signal to the speakers 22.

Figure 3:
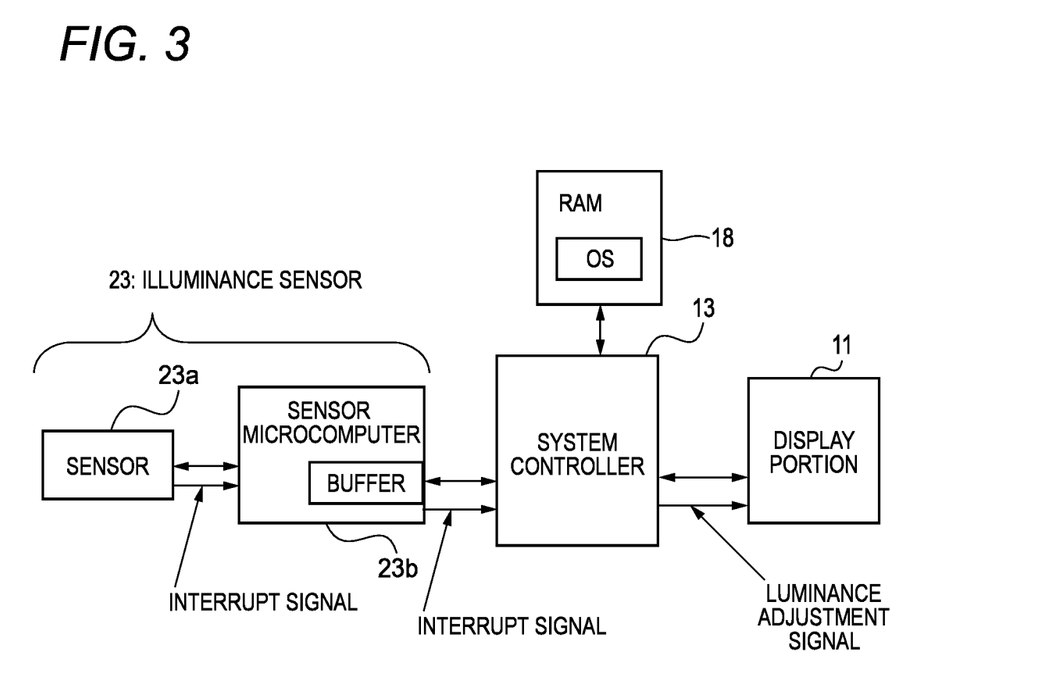
FIG. 3 is a view of the systematic configuration of an information appliance shown for explaining functions of the embodiment.

Next, the functional configuration of the information processing apparatus 100 according to the embodiment will be described with reference to FIG. 3. FIG. 3 is a block diagram showing the functional configuration of the information processing apparatus 100 according to the embodiment. As shown in FIG. 3, the functional configuration includes processes in an information appliance provided with an illuminance sensor 23, a system controller 13, a display portion 11 and an OS. The illuminance sensor 23 includes a sensor 23a and a sensor microcomputer 23b which sends a notification of sensor information to the OS. The OS automatically adjusts screen luminance based on an illuminance value.

Figure 4:
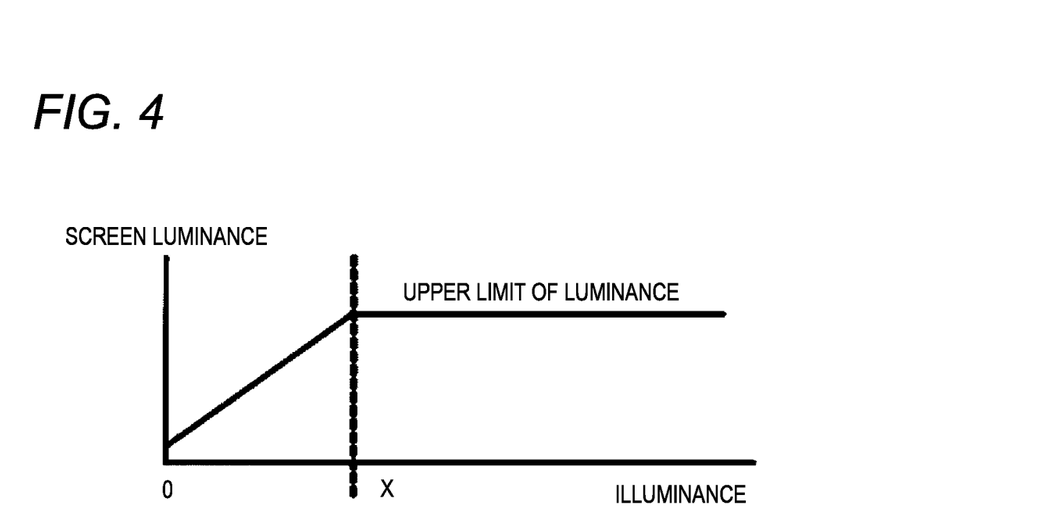
FIG. 4 is a characteristic graph showing the relation between illuminance and screen luminance according to the embodiment.

FIG. 4 is a characteristic graph showing the relation between the illuminance and the screen luminance according to the embodiment. The abscissa axis designates the illuminance (lx) and the ordinate axis designates the screen luminance ($cd/cm^2$). For example, both the two axes are represented as logarithmic axes. When the illuminance value measured by the illuminance sensor exceeds an illuminance value X which is the maximum luminance in automatic adjustment of the screen luminance performed by the OS of the information appliance as shown in FIG. 4, the luminance does not change even if the illuminance changes.

Therefore, as will be described below in detail with reference to FIG. 5 which is a flow chart, the sensor microcomputer 23b of the illuminance sensor 23 performs a process of reading an illuminance value from the sensor 23a at a predetermined interval. When the illuminance value does not exceed X in FIG. 4, the sensor microcomputer 23b sets the illuminance value read from the sensor 23a in a buffer used for reporting the illuminance value to the OS. If necessary, the sensor microcomputer 23b sends an interrupt to the OS.

Step S51: The sensor microcomputer 23b reads an illuminance value from the sensor 23a.

Step S52: The sensor microcomputer 23b determines whether the illuminance value is at least X or not. The sensor microcomputer 23b goes to Step S53 when the conclusion is No. The sensor microcomputer 23b goes to Step S54 when the conclusion is Yes.

Step S53: The sensor microcomputer 23b sets the illuminance value in the buffer as data to be read out by the OS, and waits for the OS to read out the illuminance value or sends an interrupt to the OS if necessary. After that, the sensor microcomputer 23b waits a predetermined time and returns to Step S51.

Step S54: The sensor microcomputer 23b shifts the sensor 23a to a power saving mode so that the sensor 23a does not send an interrupt unless the illuminance value falls below X.

Step S55: The sensor microcomputer 23b sets X in the buffer as data to be read out by the OS and waits for the OS to read the data but makes setting not to send an interrupt to the OS.

Step S56: The sensor microcomputer 23b determines whether there is an interrupt from the sensor 23a. The sensor microcomputer 23b goes to Step S57 when the conclusion is No. The sensor microcomputer 23b goes to Step S58 when the conclusion is Yes.

Step S57: When no illuminance value has been read by the OS for the predetermined time but a USB interface is in use, the sensor microcomputer 23b shifts a USB BUS to a Selective Suspend mode. When there is an access from the OS, the sensor microcomputer 23b cancels the Selective Suspend and returns to Step S56. Incidentally, the sensor microcomputer 23b may be configured to make connection by $I^2C$, GPIO etc. other than the USB interface.

Step S58: The sensor microcomputer 23b shifts the sensor 23a to a normal mode and sets the sensor 23a to send an interrupt to the OS. When the mode is the Selective Suspend mode, the sensor microcomputer 23b cancels this mode and returns to Step S51.

The Selective Suspend mode will be described here. First, for example, a USB Host Controller (not shown) is built in the I/O controller. The USB Host Controller is provided with plural ports one of which is connected to a USB connector to the outside of the apparatus. The sensor microcomputer 23b is connected as a USB device to the USB connector.

A USB 2.0 device is initially in a suspended state when the port to which the device is connected is suspended. Therefore, in the case where the device is connected via a hub, control transfer is transmitted to the hub. In the case where the device is directly connected to a root hub, a port register is operated (in the aforementioned case).

When the port is suspended, the master controller (USB Host Controller) suspends transmission of SOF (Start of Frame) to the USB device. The USB device turns into a suspended state when the USB device has not received the SOF for 3 milliseconds. This mechanism is called "Selective Suspend". "Selective" Suspend means that only a part of the USB tree is suspended. This is contrastive to "Global" Suspend which means that the SOF is suspended in the controller level so that the whole of the hub can be suspended.

In order to explain cooperative operation between software and hardware in the Selective Suspend, a general USB mouse connected to the USB host controller will be described by way of example.

(Device in Operating State)

Normally, plural device stacks engage in managing the USB mouse. All drivers on the USB driver stacks are collectively called "mouse driver" here for the sake of explanation. When the device stacks are simplified and shown, the hub driver serves as a bus driver of the device and the mouse driver serves as a function driver. The mouse driver also serves as a power policy owner of the device. The label "Power Policy Owner" designates a specific driver as the power policy owner in the device stacks of a USB HID device. There is an interrupt end point in the device. The interrupt end point is used in order to transmit data about various events started by a user, such as an event of pushing down a button etc. Normally, the mouse driver uses USB core stacks to reserve one or more interrupt transfers in order to receive the data from the mouse. Since the mouse driver is the power policy owner, the driver traces the use condition of the mouse so as to detect an idle state of the mouse.

(Shift to Low Power State)

After the mouse driver has detected the idle state of the device, the driver starts a process of shifting the mouse to a low power state. The mouse driver transmits a wait wake IRP to the hub driver. The hub driver reserves and stores the IRP. Next, the mouse driver specifies D2 as a target state on the device stacks and requests a set-power IRP (IRP_MN_SET_POWER in English) to start the shift to the low power state. A D2 IRP first arrives at the mouse driver and the mouse driver cancels the reserved interrupt transfers as part of the IRP processing. Next, the hub driver receives the D2 IRP. Since the wait wake IRP is reserved, the hub driver transmits control transfer to the device so that the device can be remotely released from sleep. Then, the hub driver operates a specific port register on the controller to set the port into a suspended state. The device is shifted to the low power state to keep electric power only enough to detect a release-from-sleep event and to generate a resume signal when the event occurs.

An operation to suspend a port when there is a hub between the controller and the mouse is executed not by an operation on the register but by transmission of control transfer to the hub. The hub driver and another driver in the USB driver stacks interact with hardware in a coordinated manner.

(Remote Release from Sleep)

When the user wiggles the mouse, the mouse generates a specific resume signal on an upstream cable. The controller which has received the resume signal also transmits that signal to the downstream mouse. Next, upon completion of the interrupt transfer, the controller notifies the USB driver stacks of the fact that the port has been resumed. The USB driver stacks complete the wait wake IRP which has been transmitted by the mouse driver, so as to notify the mouse driver of the fact that the mouse has turned into an operating state. Next, the mouse driver transmits the set-power IRP (D0 IRP) for requesting a D0 power state to the device stacks to set the mouse into an operating state. The D0 IRP is initially processed by the hub driver. Since the port has been resumed already, the hub driver does not perform processing but completes the IRP. Upon completion, the D0 IRP arrives at the mouse driver. In a completion routine, the mouse driver can transmit an interrupt transfer, acquire the activity of the mouse and resume the normal function.

The function of the mouse for transmitting a resume signal is activated only when the mouse is suspended. When the mouse is not suspended, the mouse driver transmits one or more reserved interrupt transfers and identifies user events. Accordingly, the software can always respond to the user events performed by the mouse in a proper range of time.

The function installed by the mouse driver in the previous scenario uses a general mechanism constituted by the D-IRP and the wait wake IRP provided by the OS in order to install the Selective Suspend. In a specific USB client driver which cannot use the mechanism, it is necessary to install a more complex method which requires transmission of an I/O control request IOCTL_INTERNAL_USB_SUB-MIT_IDLE_NOTIFICATION.

As will be described below with reference to FIG. 6 which is a flow chart, the OS reads an illuminance value at a set temporal interval Z or in response to an interrupt received from the sensor microcomputer 23b and automatically adjusts the screen luminance of the display portion 11 in accordance with the illuminance value.

Step S61: The OS reads an illuminance value from the sensor microcomputer 23b.

Step S62: The OS sets the screen luminance corresponding to the illuminance value in the display portion 11.

Step S63: The OS determines whether the OS has read substantially the same illuminance value a predetermined number of times or not. When the conclusion is No, the OS goes to Step S64. When the conclusion is Yes, the OS goes to Step S65. Here, "substantially the same" means a fluctuation range, for example, within 5%.

Step S64: The OS sets the illuminance value reading interval at Z and then goes to Step S66.

Step S65: The OS sets the illuminance value reading interval at ZZ and then goes to the Step S66.

Step 66: The OS waits the set temporal interval or waits until there is an interrupt. Then, the OS returns to the Step S61.

As shown in the flow chart of FIG. 5, when the illuminance value read from the sensor 23a exceeds X, the sensor microcomputer 23b makes setting to send an interrupt to the sensor 23a as soon as the illuminance value falls below X, and then, shifts the sensor 23a to a power saving mode (in which the illuminance value to be reported to the OS is left as X and an interrupt for a change report is also stopped so that an unnecessary process for the OS to read the illuminance value can be reduced).

After that, the sensor microcomputer 23b sets the illuminance value read from the sensor 23a in the buffer used for reporting the illuminance value to the OS, and makes setting not to send an interrupt to the OS. Unless the sensor microcomputer 23b receives, from the sensor 23a, an interrupt indicating that the illuminance value falls below X, the sensor microcomputer 23b does not read the illuminance value to update the buffer for reporting the illuminance value.

Since the sensor 23a is shifted to the power saving mode but the sensor microcomputer 23b does not have to perform a process of reading the sensor 23a, power consumption as the system can be reduced.

Figure 6:
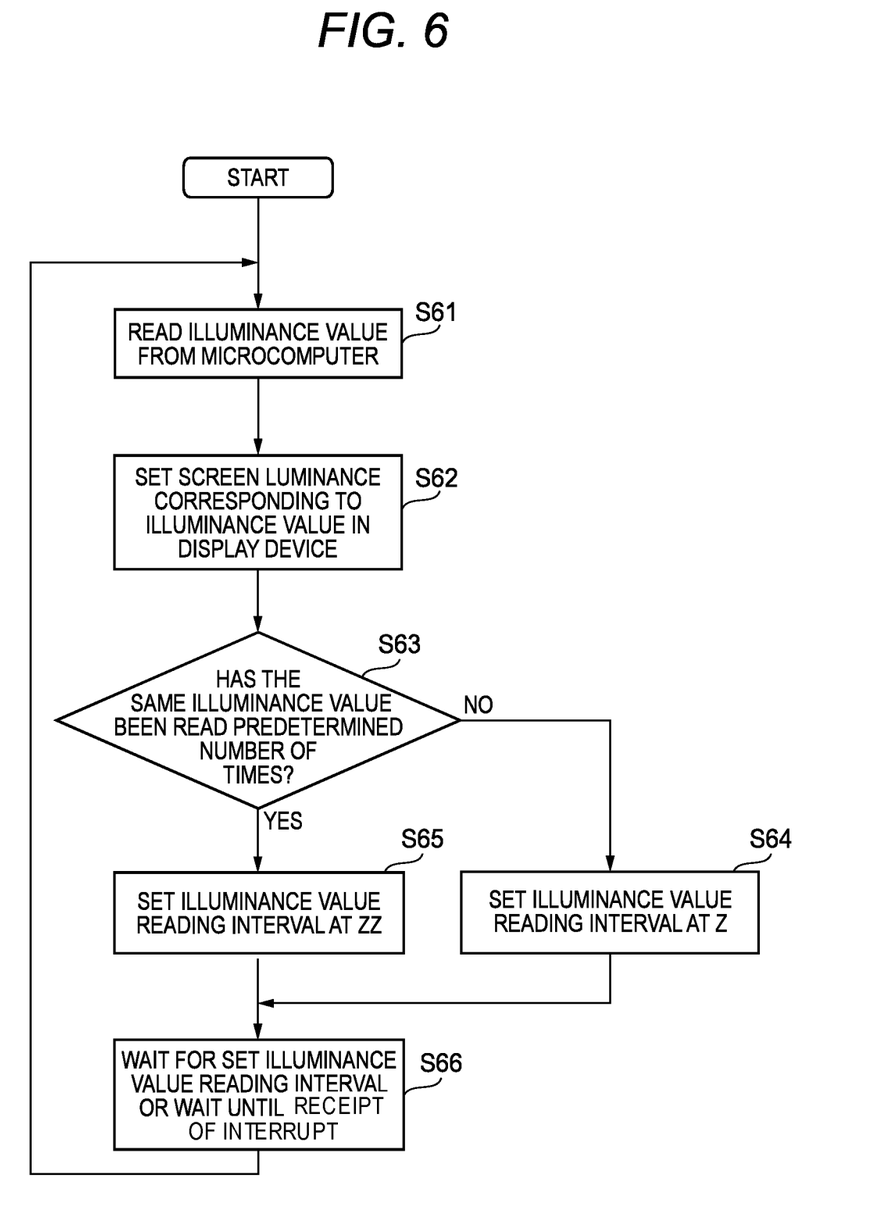
FIG. 6 is a flow chart of automatic adjustment of screen luminance performed by an OS according to the embodiment.

On this occasion, as shown in the flow chart of FIG. 6, when there is no change among the illumination values the OS has read from the sensor microcomputer 23b a predetermined number of times, the OS sets the reading temporal interval at ZZ which is remarkably longer than Z. For example, ZZ is 10 seconds and Z is one second.

When the illuminance value reading interval of the OS is prolonged, power consumption of the system can be reduced. Even in the case where the OS reads the illuminance value in response to an interrupt from the sensor microcomputer 23b, there occurs no interrupt as long as the illuminance value is at least X. Thus, the OS does not perform the process of reading the illuminance value. Accordingly, power consumption of the system can be reduced.

Figure 5:
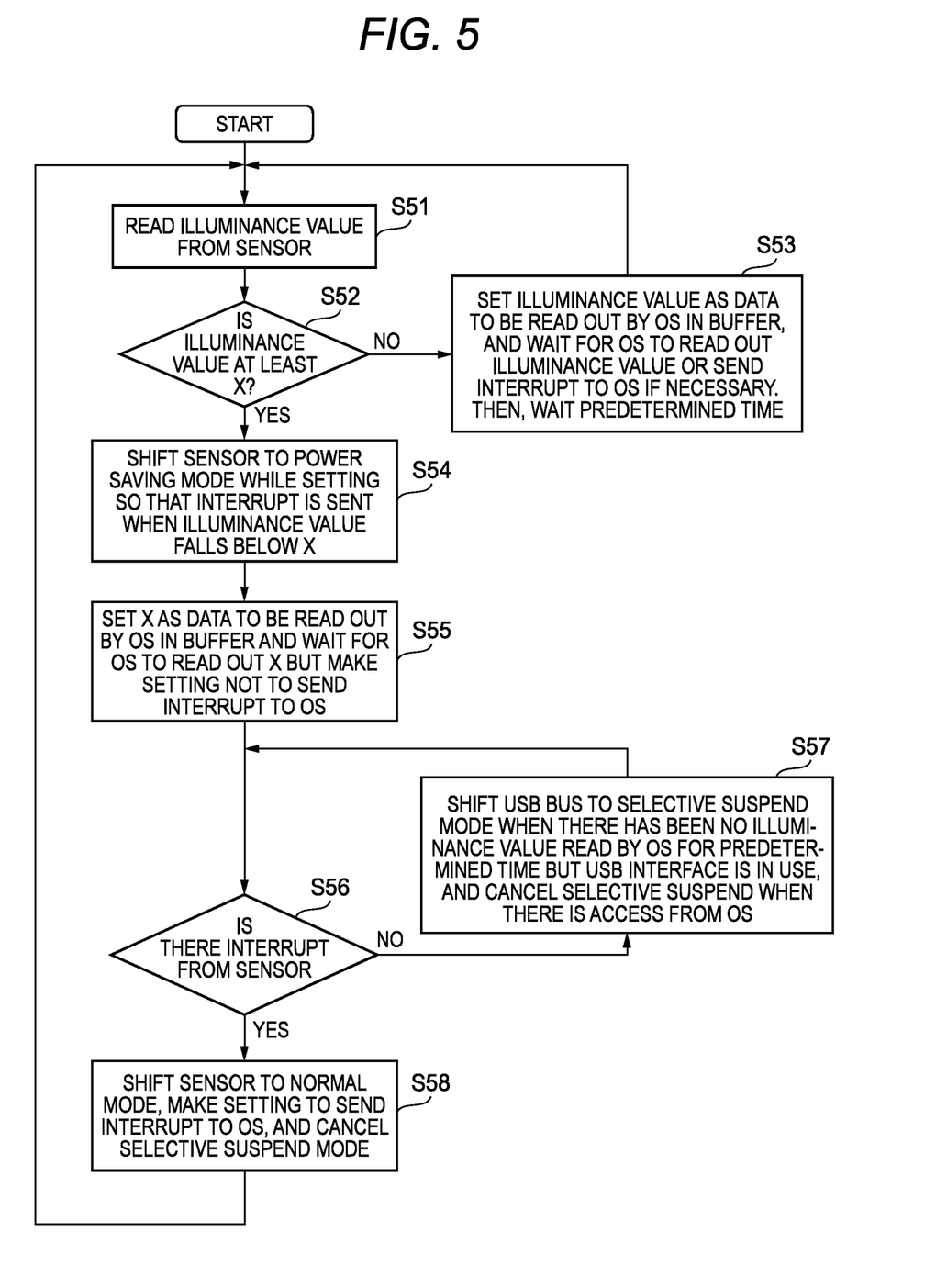
FIG. 5 is a flow chart of control performed by a microcomputer used in the embodiment.

As shown in FIG. 5, when the illuminance value falls below X and an interrupt is issued from the sensor 23a, the sensor microcomputer 23b shifts the sensor 23a from the power saving mode to the normal operating mode and returns to the process of reading the illuminance value at a predetermined interval. In this manner, the function of the OS for automatically adjusting the screen luminance can be performed as usual.

When the sensor microcomputer 23b and the system controller 13 are connected by USB, the sensor microcomputer 23b shifts the sensor 23a to the power saving mode as soon as the illuminance value falls below X. When there is no access from the OS for a predetermined time in which the sensor microcomputer 23b is waiting for an interrupt from the sensor 23a, the sensor microcomputer 23b shifts the USB bus to Selective Suspend. Thus, power consumption as the system-side USB can be also reduced.

In the power saving control system for the function of automatically adjusting the screen luminance as described above, the process of reading the illuminance value, which process is unnecessary for automatic adjustment of the screen luminance, can be eliminated so that power consumption of the system for automatic adjustment of the screen luminance can be reduced. Power saving of the luminance adjustment system as a whole can be achieved by reduction or elimination of the process of reading the illuminance when adjustment of the screen luminance is unnecessary. Accordingly, the power saving effect is high.

As a solution to the problem, there is proposed to configure such that "an information appliance includes an illuminance sensor, a microcomputer and an OS to which a notification of sensor information is sent by the microcomputer and which adjusts screen luminance automatically based on an illuminance value; wherein: when an illuminance value measured by the illuminance sensor exceeds a value X which is the maximum luminance in automatic adjustment of the screen luminance performed by the OS of the information appliance, the microcomputer sets the illuminance sensor to send an interrupt as soon as the illuminance value falls below X, and sets the illuminance sensor at a power saving mode in which the illuminance value to be reported to the OS is left as X and an interrupt for a change report is also stopped so that power consumption required for automatic adjustment of the screen luminance can be reduced".

The invention is not limited to the aforementioned embodiment. In addition thereto, the invention may be modified variously in a practical stage without departing from the spirit and scope of the invention.

When plural constituent elements disclosed in the aforementioned embodiment are combined suitably, various inventions can be formed. For example, some constituent elements may be removed from the whole constituent elements shown in the embodiment. Constituent elements according to different embodiments may be combined suitably.

The invention claimed is:

1. An information processing apparatus comprising:
a display portion including a display screen;
an illuminance sensor configured to measure an ambient brightness of the display screen at a first interval; and
a controller communicatively coupled to the illumination sensor, the controller being configured to shift the illuminance sensor to a state in which the illuminance sensor measures the ambient brightness at a second interval which is longer than the first interval when the ambient brightness exceeds a prescribed illuminance value,
wherein the illuminance sensor to store an illuminance value representative of the ambient brightness within a buffer accessible to an operating system, the operating system being configured to access the buffer and automatically adjust the ambient brightness of the display screen based on the illuminance value.

2. The information processing apparatus of claim 1, wherein the illuminance sensor is shifted to a power saving mode when the ambient brightness is not lower than a predetermined threshold.

3. The information processing apparatus of claim 2, wherein a screen illuminance of the display screen is changed based on the ambient brightness, and
wherein the predetermined threshold corresponds to a value of the ambient brightness at which the screen illuminance reaches an upper limit thereof.

4. The information processing apparatus of claim 1, wherein the controller includes a processor electrically connected to the illumination sensor, and executing the operation system to read a value of the ambient brightness from the illumination sensor, and
wherein the operation system cause the processor to read the value of the ambient brightness at the second interval based on whether or not substantially same values of the ambient brightness has been read a predetermined number of times.

5. The information processing apparatus of claim 4, wherein the operating system cause the processor to select one interval among the first interval and the second interval time.

6. The information processing apparatus of claim 1, wherein the controller includes a sensor microcomputer.

7. The information processing apparatus of claim 6, wherein the sensor microcomputer sends a signal to the operating system when the illuminance value is stored within the buffer.

8. The information processing apparatus of claim 7, wherein the signal is an interrupt.

9. An information processing method, comprising:
preparing an information processing apparatus including a display portion including a display screen and an illuminance sensor configured to measure an ambient brightness of the display screen;
measuring the ambient brightness of the display screen at a first interval by the illuminance sensor; and shifting, by a controller, the illuminance sensor to a state in which the illuminance sensor measures the ambient brightness at a second interval which is longer than the first interval when the ambient brightness exceeds a prescribed illuminance value, wherein the illuminance sensor to store an illuminance value representative of the ambient brightness within a buffer accessible to an operating system, the operating system being configured to access the buffer and automatically adjust the ambient brightness of the display screen based on the illuminance value.

10. The information processing method of claim 9, wherein the illuminance sensor is shifted to a power saving mode when the ambient brightness is not lower than a predetermined threshold.

11. The information processing method of claim 10, wherein a screen illuminance of the display screen is changed based on the ambient brightness, and wherein the predetermined threshold corresponds to a value of the ambient brightness at which the screen illuminance reaches an upper limit thereof.

\* \* \* \* \*